US007758172B2

(12) United States Patent
Kimura et al.

(10) Patent No.: US 7,758,172 B2
(45) Date of Patent: Jul. 20, 2010

(54) INJECTION APPARATUS AND A VALVE DEVICE PROVIDED IN A PASSAGE

(75) Inventors: Hitotoshi Kimura, Nagano-ken (JP); Izumi Nozawa, Nagano-ken (JP); Taku Ishizawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1731 days.

(21) Appl. No.: 10/893,564

(22) Filed: Jul. 19, 2004

(65) Prior Publication Data

US 2007/0158475 A1 Jul. 12, 2007

(30) Foreign Application Priority Data

| | | |
|---|---|---|
| Jul. 18, 2003 | (JP) | 2003-199035 |
| Jul. 25, 2003 | (JP) | 2003-201687 |
| Oct. 8, 2003 | (JP) | 2003-350007 |
| Mar. 9, 2004 | (JP) | 2004-066016 |

(51) Int. Cl.
*B41J 2/175* (2006.01)
*F16K 31/08* (2006.01)

(52) U.S. Cl. .......................................... 347/85; 251/65

(58) Field of Classification Search .................. 347/86, 347/85; 141/104; 251/65; 239/583, 549, 239/304

See application file for complete search history.

(56) References Cited

U.S. PATENT DOCUMENTS 6,568,438 B2 * 5/2003 Crossdale et al. ........... 141/104
2004/0021107 A1 * 2/2004 Kimura et al. ................ 251/65

FOREIGN PATENT DOCUMENTS

| | | | |
|---|---|---|---|
| JP | 60177381 | * | 11/1985 |
| JP | 5-263960 | A | 10/1993 |
| JP | 06-015835 | A | 1/1994 |
| JP | 8118671 | * | 5/1996 |
| JP | 2000-081162 | A | 3/2000 |
| JP | 2001304452 | * | 10/2001 |
| JP | 2002-001979 | A | 1/2002 |
| JP | 2003-034038 | A | 2/2003 |
| JP | 2003-053984 | A | 2/2003 |

* cited by examiner

*Primary Examiner*—Stephen Meier
*Assistant Examiner*—Carlos A Martinez, Jr.
(74) *Attorney, Agent, or Firm*—Sughrue Mion, PLLC

(57) ABSTRACT

An ink jet type recording apparatus comprises a connection member which has a passage for leading ink to a recording head from an ink cartridge. In the passage, a valve member having a magnetic body is provided. A rotation member has a permanent magnet and is rotatable between a first position and a second position. When the rotation member is located in the first position, an attraction that can move the valve member in an opening direction of the passage acts between the magnet and magnetic body, and hence, the valve member opens the passage. When the rotation member is located in the second position, the attraction that can move the valve member does not act between the magnet and magnetic body, and hence, the valve member closes the passage.

6 Claims, 11 Drawing Sheets

INJECTION APPARATUS AND A VALVE DEVICE PROVIDED IN A PASSAGE

BACKGROUND OF THE INVENTION

The present invention relates to a valve device and a liquid ejection apparatus.

Up to now, an ink jet type recording apparatus has been widely used as a liquid ejection apparatus which ejects a fluid toward a target. In detail, this ink jet type recording apparatus comprises a carriage, a recording head mounted in this carriage, and an ink cartridge that stores the ink, which is a fluid. Printing is performed on a recording medium by ejecting ink supplied to a recording head from the ink cartridge from a nozzle formed in this recording head with the carriage moving relatively to the recording media, such as paper.

As such an ink jet type recording apparatus, there is an "off-carriage" type where an ink cartridge is not mounted in the carriage so as to decrease the load on the carriage or to miniaturize or thin an apparatus. In this off-carriage type of ink jet type recording apparatus, ink in an ink cartridge is supplied to the recording head through a flexible ink supply tube.

Generally, when replacing an ink cartridge etc., the ink cartridge is removed from an ink supply tube. Nevertheless, in a detached state, since an ink passage from the ink supply tube to the recording head is opened to the air, there is a possibility that the ink which remains in the ink passage will leak to the outside from the ink passage, and dry.

It is then conceivable to provide a valve device in the middle of the ink passage etc., to prevent leakage of the ink from the ink passage and drying of the ink by closing the valve device at the time of replacing the ink cartridge, and etc.

A valve device applicable as the valve device as described above is disclosed in Japanese Laid-Open Patent Publication No. 2000-81162. The valve device disclosed in this publication comprises a valve body having an ink passage, and a valve member. The valve body has a valve seat which is located in the ink passage. The ink passage is opened and closed by the valve member abutting on and separating from the valve seat. The valve body comprises a film-like member which can be elastically deformed along a movement direction for ink, and the valve member is fixed to this film-like member.

The valve body is formed of a magnetic material which has a high magnetic permeability, and an excitation coil is wound around the valve body. The valve member is made of a magnetic material or a permanent magnet. In connection with the excitation coil being excited or de-excited, the valve member separates from or abuts on the valve seat, and hence, the ink passage is opened and closed thereby.

The valve device in the above-mentioned publication is constructed by an electromagnetic actuator which drives the valve member by using the excitation coil provided around the valve body. The adoption of such an electromagnetic actuator causes complication and upsizing of the valve device. In addition, since the valve member cannot be driven while an ink jet type recording apparatus is not powered, it is inferior in the degree of freedom for driving of the valve member. Furthermore, in order to achieve electromagnetic driving, it is necessary to form the valve body, which functions as a core of the excitation coil, with a magnetic material, and hence, a material which can be used as the valve body is limited. This becomes a cause for limiting the degree of freedom in the design of the valve device.

On the other hand, Japanese Laid-Open Patent Publication No. 5-263960 discloses a valve device which can decrease the noise at the time of opening and closing the valve member. The valve device disclosed in this Japanese Laid-Open Patent Publication No. 5-263960, as well as the valve device disclosed in the above-mentioned Japanese Laid-Open Patent Publication No. 2000-81162, is also constructed by an electromagnetic actuator. Therefore, also when the valve device in this Japanese Laid-Open Patent Publication No. 5-263960 is applied to an ink jet type recording apparatus, the same problem as the valve device in Japanese Laid-Open Patent Publication No. 2000-81162 arises.

SUMMARY OF THE INVENTION

An objective of the present invention is to provide a new valve device and a fluid ejection apparatus which are improved.

In order to attain the above-mentioned objects, the present invention provides the valve device provided in a passage forming member. The passage forming member has a plurality of passages for guiding a fluid stored in a fluid reservoir. It is possible to connect and disconnect the fluid reservoir to the passage forming member. The valve device includes a plurality of valve members, which are provided in the passages, respectively. Each valve member can open and close the corresponding passage. The valve device also includes an actuating mechanism, which operates the valve members. As the fluid reservoir is connected to and disconnected from the passage forming member, the actuating mechanism causes the valve members to open and close the passages concurrently.

The present invention also provides a valve device provided in the passage forming member having a passage. The valve device includes a valve seat provided in the passage, and a valve member provided in the passage. The valve member is movable in the directions of approaching and separating from the valve seat so as to close and open the passage. The valve member has a magnetic body. The valve device further includes a rotation member rotatable between a first position and a second position relative to the passage forming member. The rotation member has a magnet. When the rotation member is located in the first position, an attraction, which can move the valve member, acts between the magnet and magnetic body. When the rotation member is located in the second position, the attraction, which can move the valve member, does not act between the magnet and magnetic body.

The present invention further provides a valve device provided in the passage forming member having a passage. The valve device comprises a valve seat provided in the passage, and a valve member provided in the passage. The valve member is movable in the directions of approaching and separating from the valve seat so as to close and open the passage. The valve member has a magnetic body. The valve device further includes an actuating member movable between a first position and a second position relative to the passage forming member. The actuating member is movable in a plane intersecting the movement direction of the valve member. The actuating member has a magnet. When the actuating member is located in the first position, an attraction, which can move the valve member, acts between the magnet and magnetic body. When the actuating member is located in the second position, the attraction, which can move the valve member, does not act between the magnet and magnetic body.

In addition, the present invention provides a liquid ejection apparatus including a fluid reservoir, which stores a fluid, and a fluid ejection head, which has a nozzle. The fluid ejection head ejects a fluid from the nozzle toward a target. The liquid ejection apparatus further includes a passage forming member having a passage which leads the fluid to the fluid ejection head from the fluid reservoir. A valve seat is provided in the passage, and a valve member is provided in the passage. The valve member is movable in a first direction of approaching the valve seat and in a second direction of separating from the valve seat so as to close and open the passage. The valve member has a magnetic body. A rotation member is rotatable between a first position and a second position relative to the passage forming member. The rotation member has a magnet. When the rotation member is located in the first position, an attraction, which can move the valve member in the second direction, acts between the magnet and magnetic body. When the rotation member is located in the second position, the attraction, which can move the valve member, does not act between the magnet and magnetic body.

The present invention also provides a valve device that opens and closes a passage in which at least a part of is defined by a film material. The valve device includes a valve seat provided in the passage, and a valve member provided in the passage. The valve member is movable in directions of approaching and separating from the valve seat so as to close and open the passage. The valve device further includes an avoidance mechanism provided in the passage. The avoidance mechanism restricts movement of the valve member so as to prevent the valve member from contacting the film material.

The present invention further provides a liquid ejection apparatus including a fluid reservoir which stores a fluid, and a fluid ejection head which has a nozzle. The fluid ejection head ejects a fluid from the nozzle toward a target. The liquid ejection apparatus further includes a passage which leads the fluid to the fluid ejection head from the fluid reservoir. At least a part of the passage is defined by a film material. A valve seat is provided in the passage, and a valve member is provided in the passage. The valve member is movable in directions of approaching and separating from the valve seat so as to close and open the passage. An avoidance mechanism is provided in the passage. The avoidance mechanism restricts movement of the valve member so as to prevent the valve member from contacting the film material.

BRIEF DESCRIPTION OF THE DRAWINGS

The aspects of the present invention which are considered to be new will become clear in the attached claims. The present invention with objects and advantages will be understood by referring to the description of the preferred embodiments at present shown below with the attached drawings.

DETAILED DESCRIPTION OF THE PREFERRED EMBODIMENTS

Hereafter, one embodiment of the present invention will be explained according to FIGS. 1 to 16.

Figure 1:
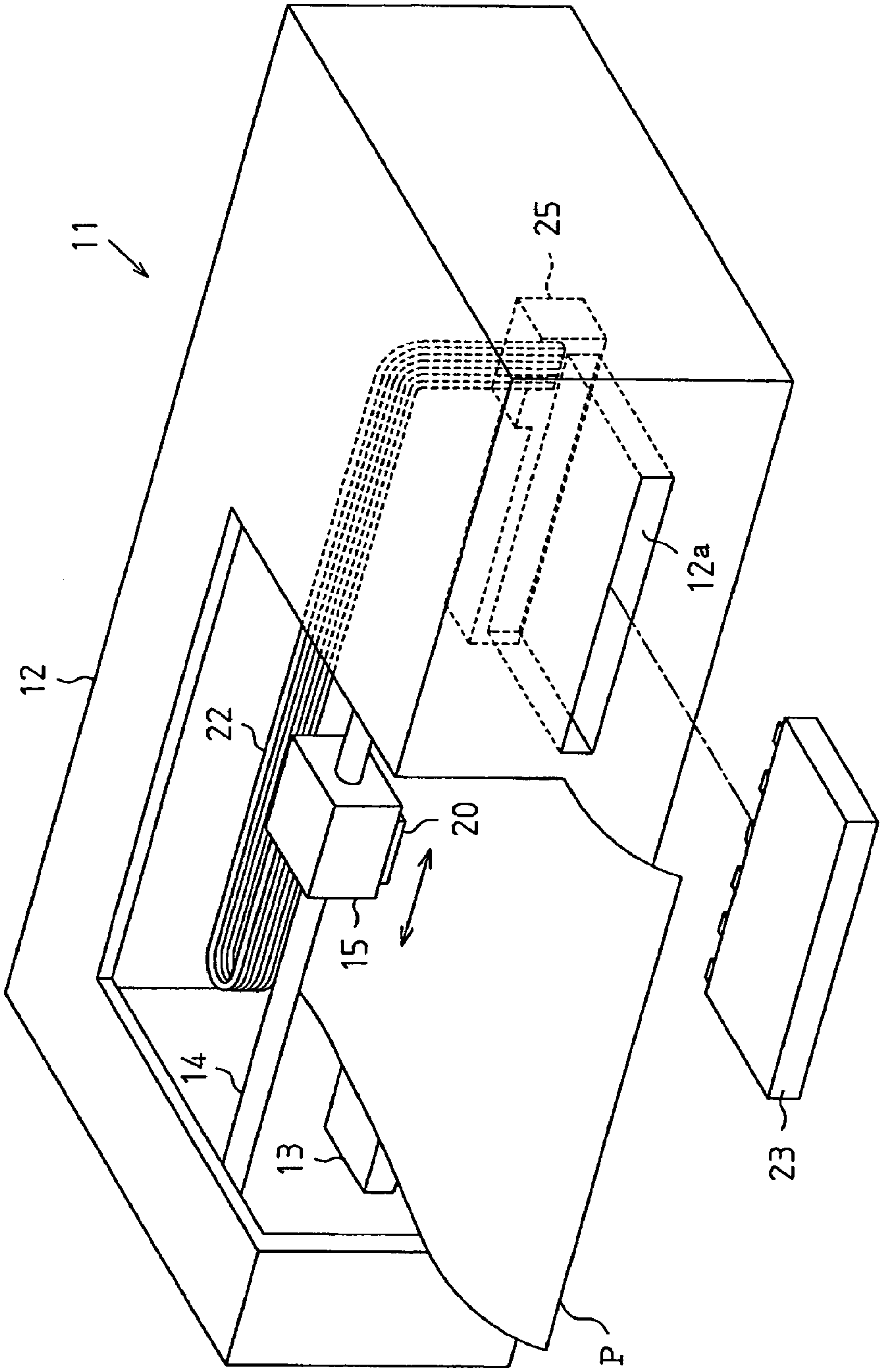
FIG. 1 is a perspective view of an ink jet type recording apparatus in one embodiment of the present invention.

As shown in FIG. 1, an ink jet type recording apparatus 11 as a liquid ejection apparatus comprises a printer housing 12, a platen 13, a guide shaft 14, a carriage 15, and a recording head 20 as a fluid ejection head. Furthermore, the ink jet type recording apparatus 11 comprises a plurality of supply tubes 22, an ink cartridge 23 as a fluid reservoir, and a connection member 25 having a valve device.

The printer housing 12 is a box with a substantially rectangular parallelepiped shape, and a cartridge holder 12*a* with a substantially rectangular parallelepiped shape is formed in one side of its front face. In this embodiment, the longitudinal direction of the printer housing 12, that is, the direction indicated with the arrow shown in FIG. 1, is the main scanning direction in this embodiment.

The platen 13 extends along the main scanning direction, and is constructed in the printer housing 12. The platen 13 is a member that supports a recording paper sheet P as a target fed by a paper feed mechanism (not shown). The recording paper sheet P is fed in the direction orthogonal to the main scanning direction, that is, the subscanning direction.

The rod-like guide shaft 14 extends along the main scanning direction, and is constructed in the printer housing 12. The guide shaft 14 is inserted into the carriage 15. The carriage 15 is movable relative to the guide shaft 14, and is reciprocable in the main scanning direction in the area facing the platen 13.

The carriage 15 is connected with a carriage transfer mechanism (not shown) including a timing belt and a carriage motor. The carriage motor is supported by the printer housing 12. When the carriage motor is driven, the carriage 15 is driven through the timing belt. That is, the carriage 15 is reciprocated along the guide shaft 14, that is, in the main scanning direction.

The recording head 20 is provided on a surface of the carriage 15 which faces the platen 13, and has a plurality of nozzles (not shown) for ejecting the ink, which is a fluid, toward the platen 13.

The supply tubes 22 are flexible tubes, and six supply tubes 22 are provided corresponding to the number of colors of ink. Each of these supply tubes 22 has an end connected to the connection member 25 described later, and another end connected to the recording head 20 through a damper, and etc.

Figure 2:
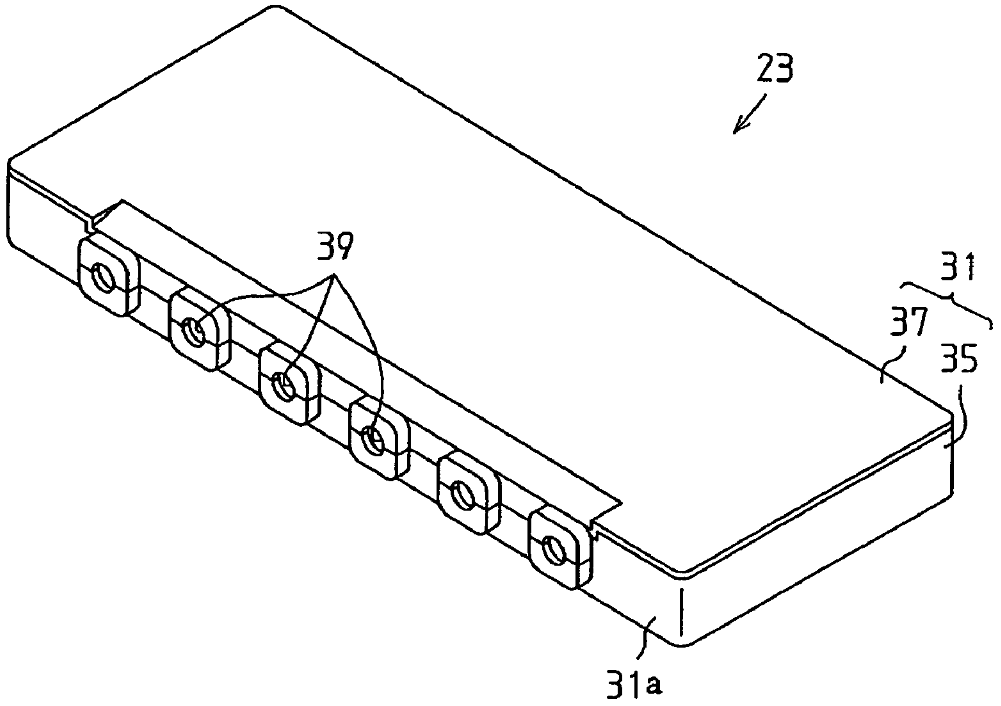
FIG. 2 is a perspective view of an ink cartridge, which is mounted in the recording apparatus of FIG. 1.
Figure 3:
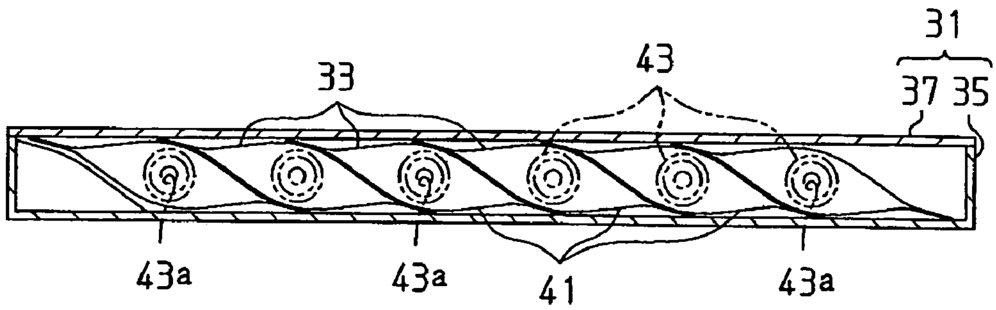
FIG. 3 is a cross-sectional view of the ink cartridge of FIG. 2.

The ink cartridge 23 is detachable from the cartridge holder 12*a*. As shown in FIGS. 2 and 3, the ink cartridge 23 comprises an ink reservoir 31 and six ink packs 33 contained in this ink reservoir 31.

The ink reservoir 31 comprises a box-shaped housing 35 having an opening in an upper portion, and a substantially plate-shaped lid 37 covering the opening of this housing 35. As shown in FIG. 2, six ink-discharging outlet ports 39 are lined up on a front face 31*a* of the ink reservoir 31, and the inside and outside of the ink reservoir 31 are made to communicate through these ink-discharging outlet ports 39.

As shown in FIG. 3, each of the ink packs 33 comprises a bag portion 41 and an ink-discharging member 43. The bag portion 41 is formed by thermally welding four sides of two sheets of laminate films. As the laminate films, for example, polyethylene films having a gas barrier property on which aluminum is vapor-deposited are available.

The inside of the bag portion 41 is filled with ink. In this embodiment, six ink packs 33 are filled with six colors of ink, that is, cyan, magenta, yellow, light cyan, light magenta, and black, respectively.

Each of the ink-discharging members 43 is substantially tubular and has an ink-discharging passage 43*a* as a fluid supply route. The ink-discharging member 43 is fixed to the bag portion 41 as it is located between two sheets of laminated film in one side of the bag portion 41, and has one end located in the inside of the bag portion 41, and another end exposed to the outside of the bag portion 41.

The ink-discharging member 43 comprises an on-off valve (not shown) in the ink-discharging passage 43*a*. The on-off valve is opened by an object being inserted into the ink-discharging passage 43*a* from the outside of the ink pack 33, and allows the ink inside the ink pack 33 to flow outside thereby. The on-off valve is closed in a state in which an object is not inserted into the ink-discharging passage 43*a* from the outside of the ink pack 33, and prevents the ink inside the ink pack 33 from leaking to the outside thereby.

The six ink packs 33 constructed as described above are contained in the ink reservoir 31 so that each ink-discharging passages 43*a* communicates with the corresponding ink-discharging outlet ports 39.

Figure 4:
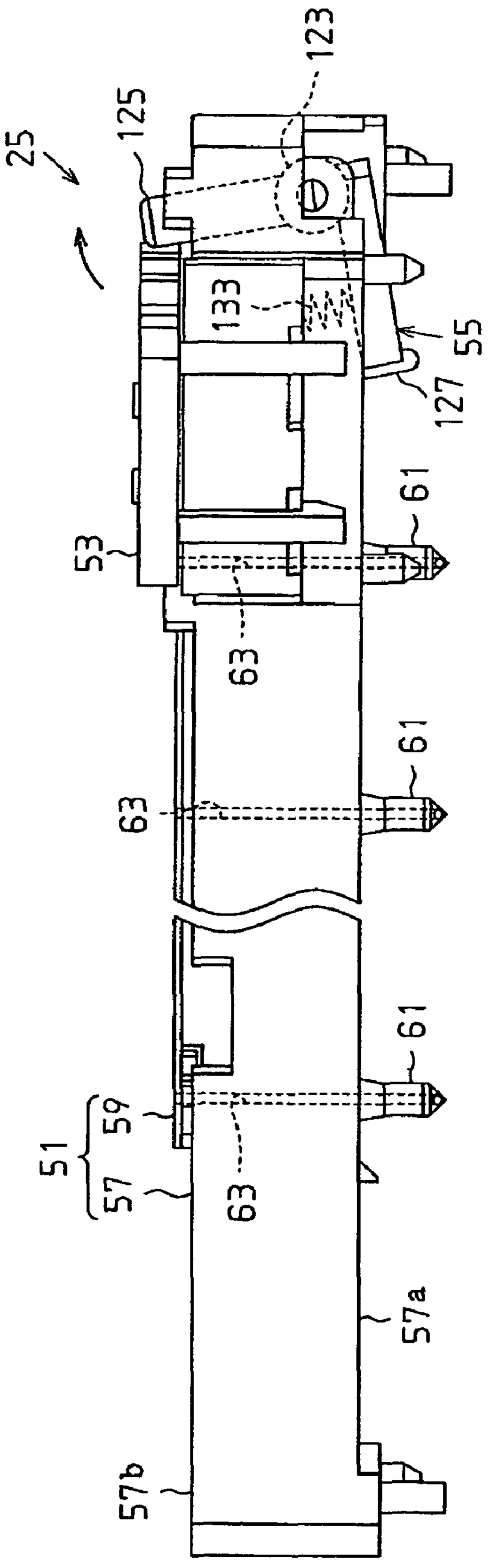
FIG. 4 is a top view of a connection member with which the recording apparatus of FIG. 1 is provided.
Figure 5:
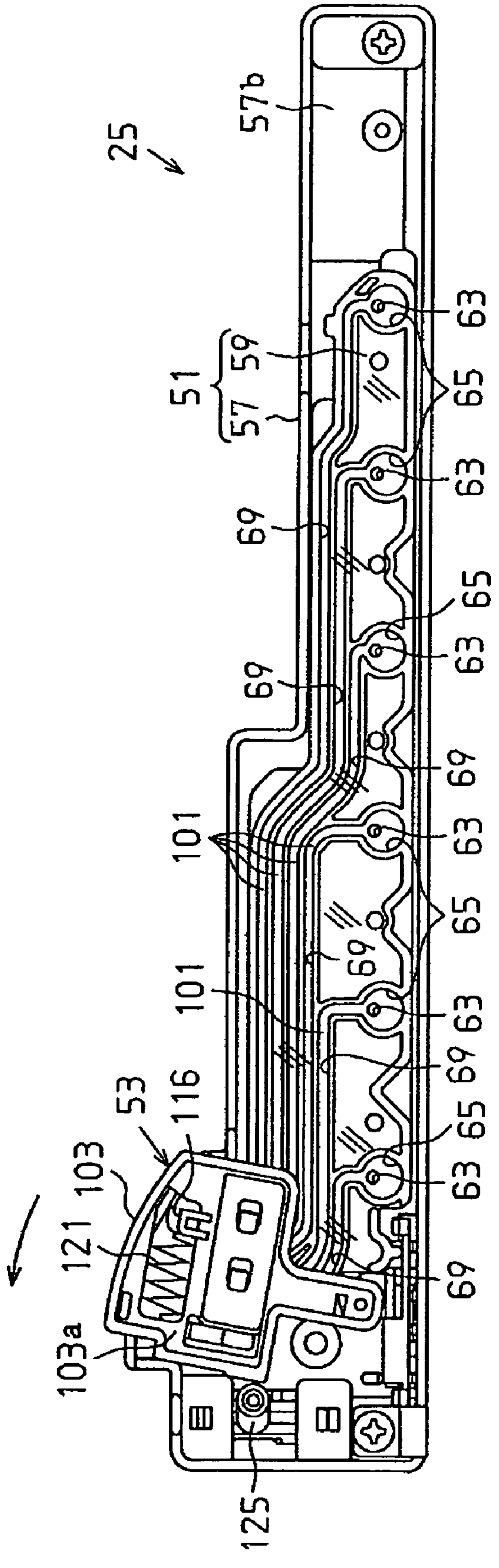
FIG. 5 is a rear view of the connection member of FIG. 4.

As shown in FIG. 1, the connection member 25 is provided so as to be located at the backside of the cartridge holder 12*a* in the printer housing 12, and is supported by the printer housing 12. When the ink cartridge 23 is inserted into the cartridge holder 12*a*, the ink cartridge 23 is connected to the connection member 25, and ink becomes ready to be supplied to the corresponding supply tube 22 from the ink packs 33 in the ink cartridge 23. As shown in FIGS. 4 and 5, the connection member 25 comprises a passage forming member 51, a rotation member (actuating member) 53, and a restricting member 55.

The passage forming member 51 forms a plurality of ink passages each of which leads ink to the corresponding supply tubes 22 from the ink pack 33. As shown in FIG. 4, the passage forming member 51 comprises a groove forming member 57, formed in a substantially rectangular parallelepiped shape, and a film material 59. The groove forming member 57 is made of a material such as polypropylene (PP). Six hollow-state needles 61 are provided in a protruding manner on a front face 57*a* of the groove forming member 57, that is, a surface 57*a* of the groove forming member 57 which faces the ink cartridge 23 which is mounted in the cartridge holder 12*a*. In addition, only three out of six needles 61 are shown in FIG. 4 for convenience. Each of the needles 63 is formed in a substantially tapered shape which becomes thin toward an end, and has the size of making it possible to be inserted into the ink-discharging outlet port 39 and the ink-discharging passage 43*a* of the ink cartridge 23. Six first penetration passages 63 which are extended toward a back face 57*b* of the groove forming member 57 from ends of the needles 61 are formed in the groove forming member 57.

As shown in FIG. 5, six circular recesses 65 are formed in the back face 57*b* of the groove forming member 57 so as to line up laterally. Each of the six first penetration passages 63 communicates with a corresponding one of the circular recesses 65.

Figure 6:
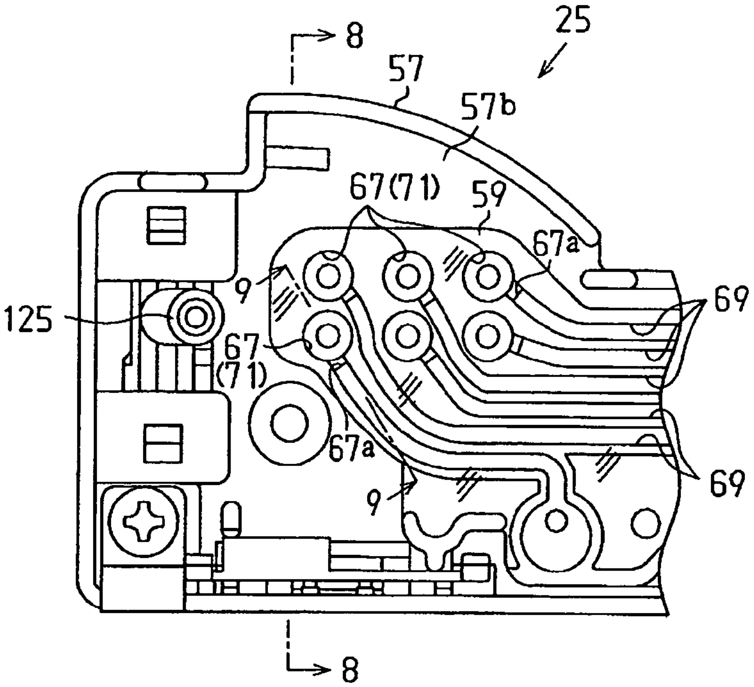
FIG. 6 is a partially enlarged rear view showing a state in which a rotation member is removed in the connection member of FIG. 5.
Figure 7:
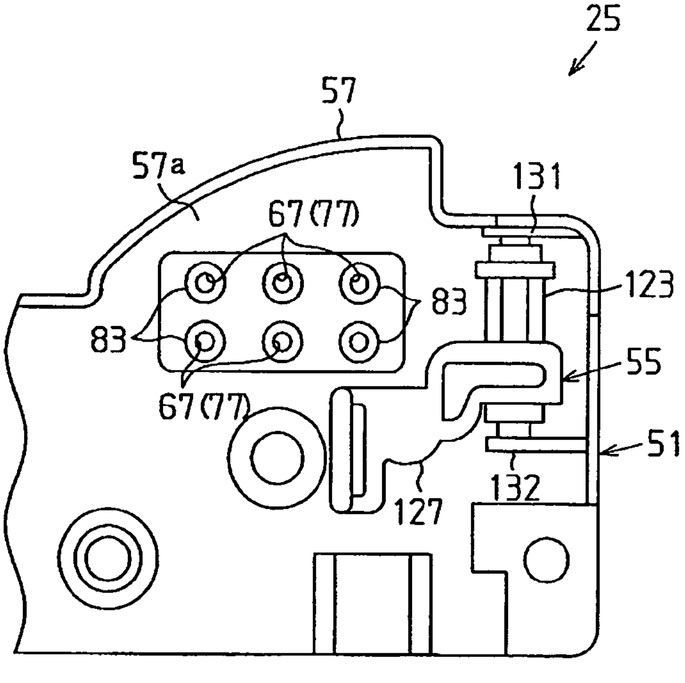
FIG. 7 is a front view showing a part of the connection member of FIG. 6.
Figure 8:
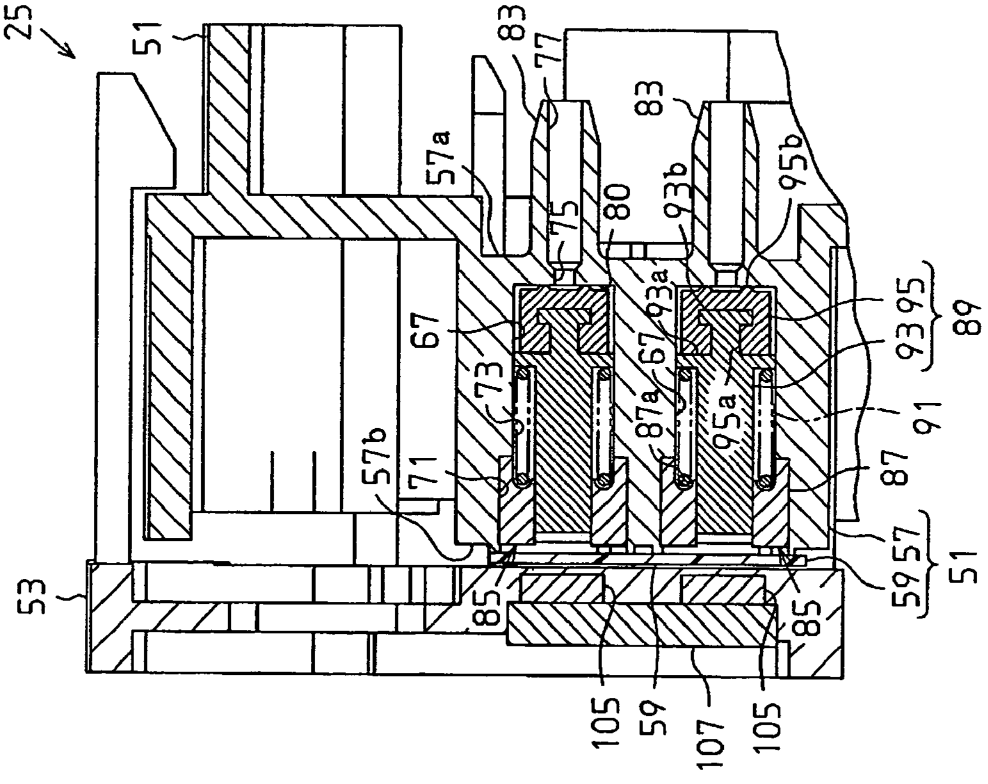
FIG. 8 is a cross-sectional view taken along line 8-8 in FIG. 6.

Six second penetration passages 67 are formed in one side portion of the groove forming member 57 (left side portion in FIG. 5) so as to penetrate the groove forming member 57 from the back face 57*b* (refer to FIG. 6) to the front face 57*a* (refer to FIG. 7), as shown in FIGS. 6 to 8. The second penetration passages 67 extend in parallel mutually, and are arranged so as to be three columns by two rows.

As shown in FIGS. 5 and 6, six grooves 69 are formed at the back face 57*b* of the groove forming member 57, each groove 69 connects one of the circular recesses 65 to a corresponding one of the second penetration passages 67. These grooves 69 extend so that each passes a different path from others.

Figure 9:
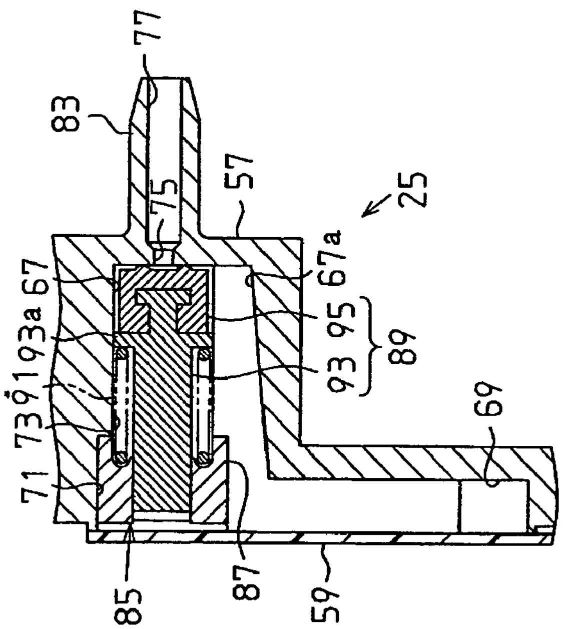
FIG. 9 is a cross-sectional view taken along line 9-9 in FIG. 6.

As shown in FIGS. 8 and 9, each of the above-mentioned second penetration passages 67 comprises a large diameter portion 71, a middle diameter portion 73, a small diameter portion 75, and a discharging portion 77 in sequence from the back face 57*b* of the groove forming member 57 toward the front face 57*a*. The large diameter portion 71 is the portion having the largest inner diameter in the second penetration passage 67. The middle diameter portion 73 has an inner diameter a little smaller than the large diameter portion 71. The communicating groove 67*a* which is extends along an axial direction is formed in inner walls of the large diameter portion 71 and the middle diameter portion 73 (refer to FIGS. 6 and 9). This communicating groove 67*a* communicates one of the second penetration passages 67 with an end of a corresponding one of the grooves 69. The small diameter portion 75 has an inner diameter smaller than the middle diameter portion 73. A step 80 which functions as a valve seat is formed between the middle diameter portion 73 and small diameter portion 75.

Cylindrical discharging members 83 are provided in a protruding manner on one side portion of the front face 57*a* of the groove forming member 57 so as to surround the small diameter portions 75 respectively. Each of the discharging portions 77 is defined by this discharging member 83. Each of the discharging members 83 corresponds to one of the supply tubes 22 (refer to FIG. 1), and is connected to an end of a corresponding one of the supply tubes 22.

Figure 10:
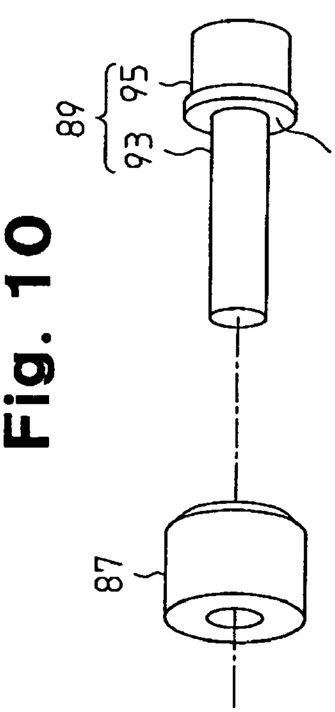
FIG. 10 is a perspective view of a guide member and a valve member with which the connection member of FIG. 8 is provided.

A valve 85 is located at each of the second penetration passages 67 constructed as described above. Each valve 85 comprises a guide member 87, a valve member 89, and a first spring 91 as a first urging member. As shown in FIGS. 8 to 10, the guide member 87 is formed in a substantially cylindrical shape, and is fit inside a corresponding one of the large diameter portions 71 of the second penetration passages 67 so as to be a tight fit. Therefore, the guide member 87 is unmovable inside the second penetration passage 67. A circular recess 87*a* is formed in the front face 57*a* of the guide member 87.

The valve member 89 comprises a magnetic body portion 93 as a first magnetic body, and a sealing portion 95 as an abutting portion, and is slidable along an axial direction inside the middle diameter portion 73.

The magnetic body portion 93 is formed with a magnetic material such as SUS 430 or SUS 410L. The magnetic body portion 93 has a substantially cylindrical shape, and is loosely fit to the guide member 87 in the second penetration passage 67. The magnetic body portion 93 comprises a flange 93*a* which has an external diameter a little smaller than the inner diameter of the middle diameter portion 73. The flange 93*a* as a guide portion is loosely fit to the middle diameter portion 73, and is in the state of abutting on an inner wall, surface of the middle diameter portion 73. The flange 93*a* restricts a motion of the magnetic body portion 93 in the radial direction. In addition, the magnetic body portion 93 comprises an engaging projection 93*b* extending from an end face of the flange 93*a*.

The sealing portion 95 has a substantially cylindrical shape, and has an external diameter smaller than that of the flange 93*a*. The sealing portion 95 comprises an engaging recess 95*a,* and the sealing portion 95 is fixed to the magnetic body portion 93 by the engaging projection 93*b* engaging with this engaging recess 95*a*. The sealing portion 95 comprises a contacting portion 95*b,* which is formed by annular projection, in its end surface. When the contacting portion 95*b* abuts on the step 80 in the second penetration passage 67, the middle diameter portion 73 is shut down from the small diameter portion 75 (refer to FIGS. 8 and 9). The sealing portion 95 is made of an elastic material such as elastomer, CR rubber, silicone rubber, isobutylene-isoprene rubber, or NBR.

The first spring 91 is a compression spring and is located between the guide member 87 and the valve member 89. In detail, an end of the first spring 91 is engaged with the circular recess 87*a* of the guide member 87, and another end of the first spring 91 abuts on the flange 93*a* of the valve member 89. Accordingly, this first spring 91 urges the valve member 89 so as to separate the valve member 89 from the guide member 87.

As mentioned above, the guide member 87 is fixed to the inner wall surface of the second penetration passage 67. Therefore, in the state that no force is applied from the outside, the valve member 89 is maintained by the urging force of the first spring 91 in the state of abutting on the step 80. Thus, the valve member 89 is maintained in a state where the second penetration passage 67 is closed. In addition, when the valve member 89 is moved against the urging force of the first spring 91 so as to separate the valve member 89 from the step 80, the second penetration passage 67 is opened, and a continuous passage which reaches from the communicating groove 67*a* to the discharging portion 77 through the middle diameter portion 73 and small diameter portion 75 is formed (refer to FIG. 16). In this way, by the valve member 89 moving in the direction of the urging force received from the first spring 91 or in its opposite direction, the second penetration passage 67 is closed or opened.

As shown in FIGS. 4 to 6, 8, and 9, the film material 59 is formed by stacking a material having an excellent gas barrier property, such as polyethylene terephthalate (PET), or polypropylene (PP), and attached on the back face 57*b* of the groove forming member 57 by thermal welding. As shown in FIGS. 5 and 6, the film material 59 covers the circular recesses 65 on a groove forming member 57, the grooves 69, and the openings of the second penetration passages 67, and thereby, six guide passages 101 respectively corresponding to colors of ink are formed.

As a consequence, in the passage forming member 51, six passages each including the first penetration passage 63 (refer to FIG. 4), the guide passage 101 (refer to FIG. 5), and the second penetration passage 67 (refer to FIGS. 8 and 9) are formed in the state of being mutually independent. It is possible to supply each color of ink in the ink cartridge 23 to a corresponding supply tube 22 through a corresponding passage in the passage forming member 51.

Figure 11:
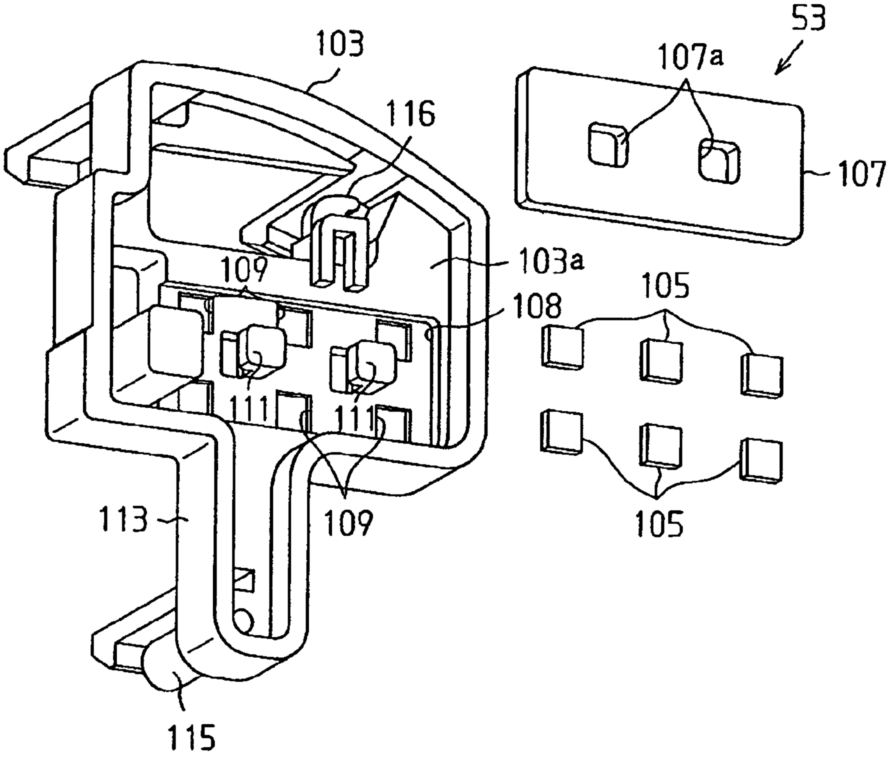
FIG. 11 is an exploded perspective view of the rotation member.

As shown in FIG. 11, the rotation member 53 comprises a main body 103, six magnets (specifically, permanent magnets) 105, and a plate 107 as a second magnetic body. In an outer side face 103*a* of the main body 103, a recess 108 corresponding to the plate 107 having a substantially rectangular shape is formed. In a bottom face of this recess 108, six recesses 109 are provided corresponding to the permanent magnets 105, with each having a substantially square shape. Similarly to the six second penetration passages 67 in the passage forming member 51, these six recesses 109 are arranged in three columns by two rows. Arrangement intervals of six recesses 109 are the same as those of six of the second penetration passages 67.

Two locking projections 111 project from the bottom face of the recess 108. An arm portion 113 extends from an outer circumferential portion of the main body 103. A shank 115 having a cylindrical shape extends in the direction opposite to the locking projections 111 from an end of the arm portion 113. The main body 103 further comprises a spring-locking portion 116.

Each of the permanent magnets 105 is formed in a substantially square plate-like shape, and is fit in one of the recesses 109. The plate 107 is formed in a substantially rectangular plate-like shape while being made of a magnetic material such as magnetic soft iron, and has two through-holes 107*a*. The plate 107 is installed in the main body 103 by being fit in the recess 108. At this time, the locking projections 111 of the main body 103 are engaged with the plate 107 in the state of being inserted into the through-holes 107*a* of the plate 107 (refer to FIG. 12). As a result, the permanent magnets 105 are fixed to the main body 103 while being located between the main body 103 and plate 107.

Figure 12:
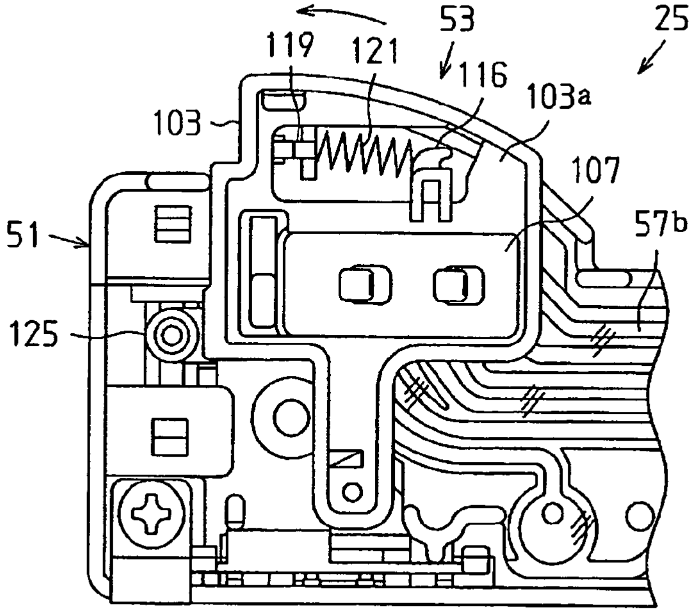
FIG. 12 is a partially enlarged rear view showing a state in which a rotation member is attached in the connection member of FIG. 6.

The shank 115 is rotatably supported by bearings. (not shown) of the passage forming member 51, and thereby, the rotation member 53 is installed in the passage forming member 51 rotatably around the shank 115 as shown in FIGS. 5 and 12. A surface (not shown) opposite to an outer side face 103*a* of the main body 103 faces opening portions of the second penetration passages 67 in a back face 57*b* of the groove forming member 57.

The rotation member 53 is rotatable to the passage forming member 51 in the arrowed direction shown in FIGS. 5 and 12, and the direction opposite to the direction of the arrow. In this embodiment, the rotation member 53 is reciprocable between a position (first position) shown in FIG. 12, and a position (second position) shown in FIG. 5. The rotation member 53 is rotatable in a plane intersecting the movement direction of the valve member 89 (refer to FIGS. 8 and 9), and specifically, in a plane perpendicular to the movement direction of the valve member 89.

Figure 13:
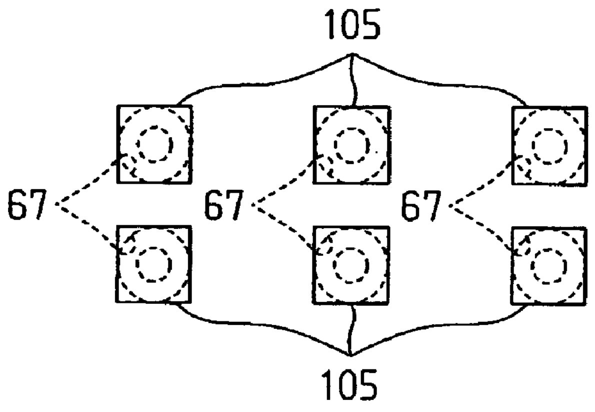
FIG. 13 is a schematic diagram showing the positional relation between second penetration passages and permanent magnets.

When the rotation member 53 is located in the first position shown in FIG. 12, each of the permanent magnets 105 of the rotation member 53 matches with the corresponding one of the second penetration passages 67 in the passage forming member 51 in regard to the movement direction of the valve member 89, as shown in FIG. 13. In other words, each of the permanent magnets 105 matches with the valve member 89 in the corresponding second penetration passage 67 in the movement direction of the valve member 89. In this state, an attraction acting between each of the permanent magnets 105 and the magnetic body portion 93 (refer to FIG. 8) of the valve member 89 corresponding to it can move the valve member 89 toward the permanent magnet 105 against the urging force of the first spring 91 (refer to FIG. 8).

Figure 14:
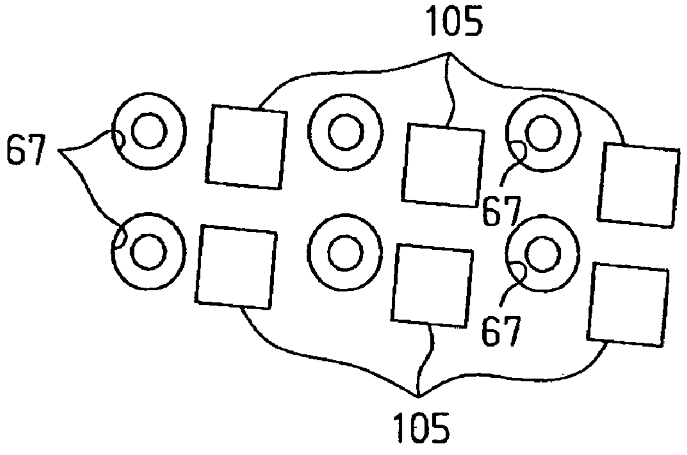
FIG. 14 is a schematic diagram showing the positional relation between the second penetration passages and permanent magnets.

On the other hand, when the rotation member 53 is located in the second position shown in FIG. 5, the six permanent magnets 105 do not match with any of the second penetration passages 67 in regard to the movement direction of the valve member 89, as shown in FIG. 14. In other words, all the permanent magnets 105 do not match with any of the valve members 89 in the second penetration passages 67 in regard to the movement direction of the valve member 89. In this state, attraction acting between the permanent magnets 105 and the magnetic body portion 93 of the valve member 89 cannot move the valve member 89 toward the permanent magnets 105 against the urging force of the first spring 91.

That is, when the rotation member 53 is located in the first position, an attraction which can separate the valve member 89 from the step (valve seat) 80 against the urging force of the first spring 91 acts between the permanent magnet 105 and magnetic body 93. On the other hand, when the rotation member 53 is located in the second position, an attraction which can separate the valve member 89 from the step (valve seat) 80 against the urging force of the first spring 91 does not act between the permanent magnet 105 and magnetic body 93. In connection with the rotation member 53 moving between the first position and second position, the valve member 89 moves between the closing position of abutting on the step 80, and the opening position of separating from the step 80.

As shown in FIGS. 5 and 12, the second spring 121 has an end engaged with the spring-locking portion 116 of the rotation member 53, and another end engaged with the hook portion 119 (refer to FIG. 12) formed in the passage forming member 51. The second spring 121 is a tension spring, and urges the rotation member 53 toward the first position. The rotation member 53 is located in the first position by the second spring 121 in the state of not receiving an external force.

As shown in FIGS. 4 and 7, the restricting member 55 comprises a shank 123 having a substantially cylindrical shape, and a first arm portion 125, and a second arm portion 127. As shown in FIG. 7, since both ends of the shank 123 are supported rotatably, respectively by bearings 131 and 132, which are formed in the passage forming member 51, the shank 123 is rotatable relative to the passage forming member 51.

As shown in FIG. 4, each of the first arm portion 125 and second arm portion 127 extends from the shank 123 toward the outside of the radial direction of the shank 123. An angle formed by the first arm portion 125 and second arm portion 127 is about 90 degrees. The restricting member 55 is rotatable around the shank 123 in the direction of the arrow shown in FIG. 4, and the direction opposite to that of the arrow. The first arm portion 125 extends toward the back face **57*b* of the groove forming member 57, and its end can abut on the rotation member 53**.

Figure 15:
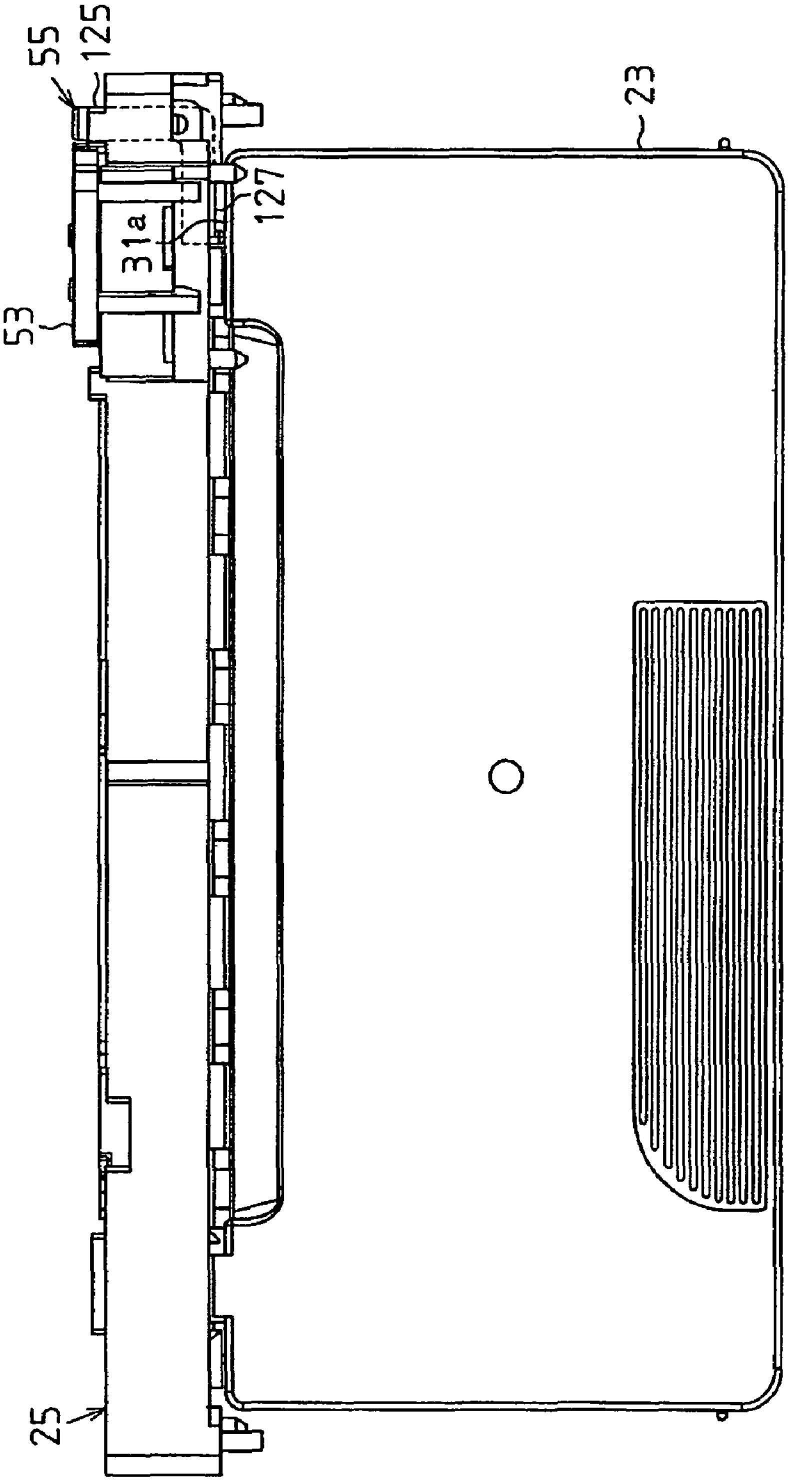
FIG. 15 is a top view showing a state in which an ink cartridge is connected to the connection member.

The restricting member 55 is reciprocable between a restriction position shown in FIG. 4, and a non-restriction position shown in FIG. 15. When the restricting member 55 is located in the restriction position shown in FIG. 4, the first arm portion 125 restricts the movement of this rotation member 53 so that the rotation member 53 may be located in the second position (refer to FIG. 5). At this time, one end of the second arm portion 127 projects from the front face **57*a* of the groove forming member 57**.

When the restricting member 55 is located in the non-restriction position shown in FIG. 15, the first arm portion 125 does not restrict the movement of the rotation member 53 so that the rotation member 53 can move to the first position. At this time, the end of the second arm portion 127 does not project from the front face **57*a* of the groove forming member 57**.

As shown in FIG. 4, a third spring 133 as a third urging member is provided between the second arm portion 127 of the restricting member 55, and passage forming member 51. The third spring 133 is a compression spring and urges the restricting member 55 toward the restriction position. The urging force of the third spring 133 is larger than the urging force of the second spring 121 (refer to FIG. 12). Hence, since the restricting member 55 is moved to the restriction position by the urging force of the third spring 133 in the state that no force is applied from the outside, the rotation member 53 is located in the second position.

When the ink cartridge 23 is connected to the connection member 25 as shown in FIG. 15, each of the needles 61 of the connection member 25 is inserted in one of the ink-discharging members 43 (refer to FIG. 3) of the ink cartridge 23. In this state, since the second arm portion 127 is pressed by the front face **31*a* of the ink cartridge 23, the restricting member 55** is rotated to the non-restriction position.

Next, operation of the ink jet type recording apparatus 11 constructed as described above will be explained.

FIGS. 4 and 5 show the state where the ink cartridge 23 is not mounted in the connection member 25. In this state, the restricting member 55 is located in the restriction position by the urging force of the third spring 133, and engages with the rotation member 53 so that the rotation member 53 may be restricted in the second position. Therefore, as shown in FIG. 14, the permanent magnets 105 of the rotation member 53 are located out of the valve members 89 in the second penetration passages 67 in regard to the movement direction of the valve members 89. In this state, an attraction which can separate the valve member 89 from the step 80 against the urging force of the first spring 91 does not act between the permanent magnet 105 and value members 89.

Hence, as shown in FIG. 8, since the valve members 89 are maintained in the state abutting on the steps 80, the second penetration passages 67 are closed. In consequence, since the inside of the supply tubes 22 connected to the connection member 25 is shut down from the air, ink is prevented from leaking outside from the connection member 25, and from drying. That is, in the state that the ink cartridge 23 is not mounted in the connection member 25, since the second penetration passages 67 inside the connection member 25 are closed, leakage of ink from the ink passages including the supply tubes 22, and drying of the ink are effectively prevented.

When the ink cartridge 23 is mounted in the connection member 25, the needles 61 of the connection member 25 are inserted into the ink-discharging members 43 (refer to FIG. 3) of the ink cartridge 23, respectively. Then, as shown in FIG. 15, since the second arm portion 127 of the restricting member 55 is pressed by the front face **31*a* of the ink cartridge 23, the restricting member 55** is rotated to the non-restriction position.

In consequence, since the engagement between the restricting member 55 and the rotation member 53 is released, the rotation member 53 is rotated toward the first position by the urging force of the second spring 121, as shown in FIG.

12. When the rotation member 53 is located in the first position, each of the permanent magnets 105 matches with the valve member 89 of the corresponding second penetration passage 67 in regard to the movement direction of the valve member 89, as shown in FIG. 13. In this state, an attraction which can separate the valve member 89 from the step 80 against the urging force of the first spring 91 acts between the permanent magnet 105 and value members 89.

Figure 16:
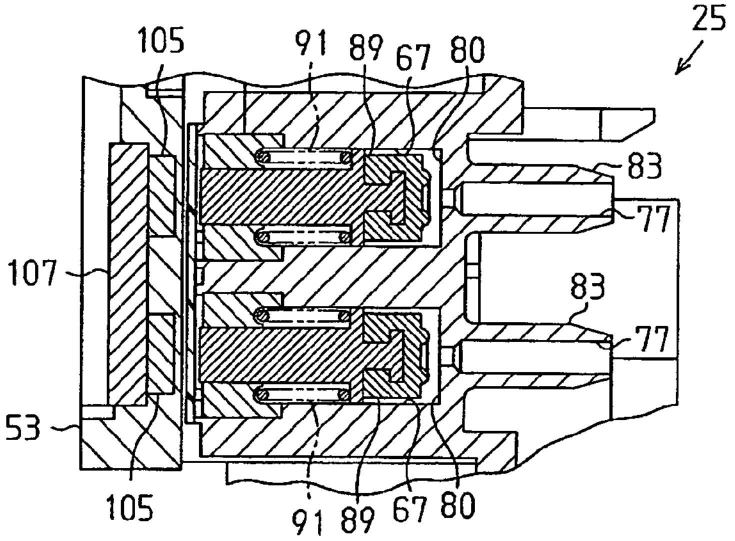
FIG. 16 is a cross-sectional view showing a state which the second penetration passages are opened in the connection member of FIG. 8.

Hence, as shown in FIG. 16, since the valve members 89 move so as to separate from the steps 80 respectively, the second penetration passages 67 are opened. As a result, continuous ink passages from the ink cartridge 23 to the supply tubes 22 are formed. In this state, the ink jet type recording apparatus 11 performs printing on the recording paper sheet P on the basis of print data by driving the carriage transfer mechanism, paper feed mechanism, recording head 20, and the like.

When the ink cartridge 23 is removed from the connection member 25, the restricting member 55 is moved to the restriction position by the urging force of the third spring 133. At this time, the restricting member 55 presses the rotation member 53 so that the rotation member 53 may be moved to the second position. As a result, since the attraction which may separate the valve members 89 from the steps 80 disappears, the valve members 89 move to positions abutting on the steps 80 to close the second penetration passages 67, as shown in FIG. 8.

In addition, as shown in FIG. 16, the plate 107 of the rotation member 53 located in the first position faces the valve members 89 with the permanent magnets 105 in between. This plate 107 functions as a "back yoke", and increases the attraction between the permanent magnets 105 and the value members 89.

This embodiment has the following advantages.

(1) The rotation member 53 rotates around the shank 115 so as to be able to move between the first position and second position. When the rotation member 53 is located in the first position, the attraction between the permanent magnets 105 of the rotation member 53 and the magnetic body portions 93 of the valve members 89 increases, and hence, the valve members 89 move in the direction of separation from the steps 80. On the other hand, when the rotation member 53 is located in the second position, the attraction between the permanent magnets 105 and magnetic body portions 93 decreases, and hence, the valve members 89 are located in the positions of abutting on the steps 80 respectively. The rotation member 53 rotates in a plane intersecting the movement direction of the valve members 89, and specifically, in a plane perpendicular to the movement direction of the valve members 89.

In this way, in connection with the rotation of the rotation member 53 in the plane perpendicular to the movement direction of the valve members 89, the valve members 89 move between the positions of abutting on the steps 80, and the positions separated from the steps 80, and thereby, the second penetration passages 67 are closed and opened. In comparison to the case where the permanent magnets 105 are linearly moved along the movement direction of the valve members 89, this enables the miniaturization of the ink jet type recording apparatus 11 since the movement range of the permanent magnets 105 is lessened. In addition, manufacturing precision in mass production increases in comparison to the case where the permanent magnets 105 are linearly moved.

(2) Since being located in the outside of the passage forming member 51, the permanent magnets 105 provided in the rotation member 53 are not located in an environment where ink exists. Hence, it is possible to freely select a material for the permanent magnets 105 without considering influences of degradation by ink, and the like.

(3) The valve members 89 are urged toward the steps 80 with the first springs 91 respectively. Except for the rotation member 53 being located in the first position, the valve members 89 are maintained by the urging forces of the first springs 91 in the state of abutting on the steps 80, respectively. Therefore, the valve members 89 properly and certainly operate in connection with the movement of the rotation member 53.

(4) Each of the valve members 89 comprises a sealing portion 95, made of an elastic material, in a portion that can abut on each of the steps 80. Accordingly, the valve members 89 abut in a high degree of adhesion on the steps 80 to close the second penetration passages 67 securely.

(5) The rotation members 53 are urged toward the first position by the second springs 121, respectively. The rotation member 53 is moved to the first position only by the force of the second spring 121 from the second position. Therefore, it is possible to simplify the construction which is necessary for driving the rotation member 53.

(6) Each of the valve members 89 comprises a slidable flange 93*a* on each inner wall surface of the second penetration passages 67. Each of the valve members 89 stably moves inside of a second penetration passage 67 while being guided by a flange 93*a*. Therefore, the switching operation of opening and closing of the second penetration passages 67 by the valve members 89 is stably performed.

(7) When the rotation member 53 is located in the first position, the permanent magnets 105 face the valve members 89 with the thin film material 59 in between. Accordingly, since it is possible to shorten the distance between the permanent magnets 105 and valve members 89 respectively, it becomes easy for the magnetism of the permanent magnets 105 to reach the valve members 89. Therefore, it is possible to efficiently use the magnetism of the permanent magnets 105 as the force for attracting the valve members 89, respectively.

(8) When the ink cartridge 23 is inserted into the cartridge holder 12*a* and is connected to the connection member 25, the restricting member 55 is moved to the non-restriction position by the ink cartridge 23, and hence, the rotation member 53 is allowed to move to the first position from the second position. In addition, when the ink cartridge 23 is pulled out from the cartridge holder 12*a* to be separated from the connection member 25, the restricting member 55 moves to the restriction position to move the rotation member 53 to the second position from the first position. That is, only by inserting the ink cartridge 23 into the cartridge holder 12*a* and pulling out the ink cartridge 23 from the cartridge holder 12*a*, it is possible to switch the second penetration passages 67 between an opening state and a closing state. Since it is not necessary to use an actuator such as an electromagnetic actuator so as to switch the second penetration passages 67 between the opening state and closing state, it is possible to simplify the construction of the apparatus. In addition, since it is possible to switch the second penetration passages 67 into the opening state and closing state even if the ink jet type recording apparatus 11 is not powered, the degree of freedom of the switching improves.

(9) When the ink cartridge 23 is not inserted in the cartridge holder 12*a*, the second penetration passages 67 are closed, and when the ink cartridge 23 is inserted into the cartridge holder 12*a*, the second penetration passages 67 are opened. Accordingly, when the ink cartridge 23 is separated from the connection member 25, the ink in the supply tubes 22 is shut off to the air, and hence, the ink is effectively prevented from leaking outside from the supply tubes 22 or the ink from drying.

(10) When the ink cartridge 23 is not inserted into the cartridge holder 12*a,* the restricting member 55 in the restriction position holds the rotation member 53 in the second position, and hence, the second penetration passages 67 are securely maintained in the closed state. Hence, the leak and drying of ink in the state where the ink cartridge 23 is separated from the connection member 25 are further securely prevented.

(11) The restricting member 55 comprises the first and second arm portions 125 and 127 which are extended from the shank 123 toward the outer radial direction, and both the arm portions 125 and 127 forms an angle of about 90 degrees. The restricting member 55 rotates in relation to the connection and separation of the ink cartridge 23 to the connection member 25, and rotates the rotation member 53 between the first and second positions. The rotation member 53 rotates in the plane perpendicular to the direction where the ink cartridge 23 moves for the connection and separation to the connection member 25. The restricting member 55 is located between the ink cartridges 23 and rotation member 53 whose movement directions are mutually different, and transmits the motion of the ink cartridge 23 to the rotation member 53. Since such a restricting member 55 eliminates the necessity of designing the ink jet type recording apparatus 11 so that the movement direction of the ink cartridge 23 may coincide with the movement direction of the rotation member 53, the degree of freedom of designing the ink jet type recording apparatus 11 is increased. This enables the miniaturization of the apparatus.

(12) The restricting member 55 is urged toward the restriction position by the third spring 133. The restricting member 55 is moved to the restriction position from the non-restriction position only by a force of the third spring 133. Therefore, it is possible to simplify the construction which is necessary for driving the restricting member 55.

(13) The third spring 133, which urges the restricting member 55, exerts a larger urging force than that of the second spring 121 which urges the rotation member 53. Accordingly, the restricting member 55 securely holds the rotation member 53 in the second position in the state where the ink cartridge 23 is not inserted into the cartridge holder 12*a.*

(14) The ink passages formed in the passage forming member 51 each have an inlet port formed of a needle 61, and each outlet port formed of a discharging member 83. The outlet ports of these ink passages converge and are provided in a predetermined location of the passage forming member 51 (connection member 25), and specifically, a location near an end. Then, the valve members 89 are provided in the portion of the passages of the outlet ports where they converge, that is, inside the second penetration passages 67 that construct the outlet ports, respectively. Hence, all the valve members 89 are located intensively in the predetermined location of the connection member 25. Therefore, not only it is possible to miniaturize and simplify the mechanism (including the rotation member 53 and restricting member 55) which concurrently operates these valve members 89, but also it is possible to provide the valve members 89 without taking up much space.

(15) The ink passages which are formed in the passage forming member 51 and guide ink, which is supplied from the ink cartridge 23, respectively, are opened and closed concurrently by the inserting and separating operation of the ink cartridge 23 to the connection member 25. Therefore, it is possible to miniaturize and simplify the mechanism for opening and closing the ink passages.

Next, according to FIGS. 17 to 19, with focus on differences from the embodiments shown in FIGS. 1 to 16, another embodiment of the present invention will be explained.

Figure 17:
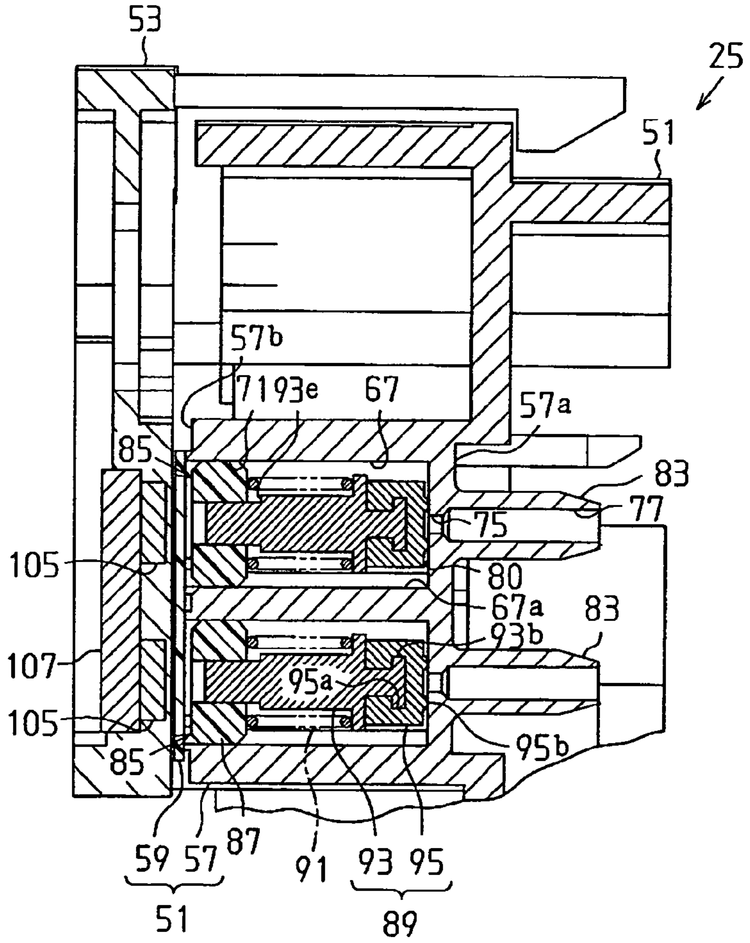
FIG. 17 is a cross-sectional view of the connection member in another embodiment of the present invention.
Figure 18:
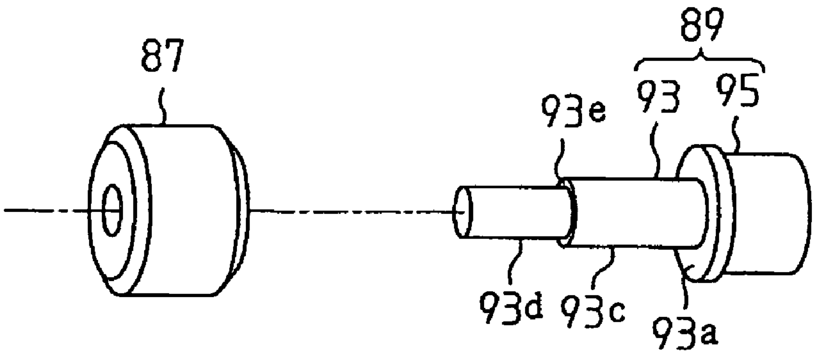
FIG. 18 is a perspective view of a guide member and a valve member with which the connection member of FIG. 17 is provided.
Figure 19:
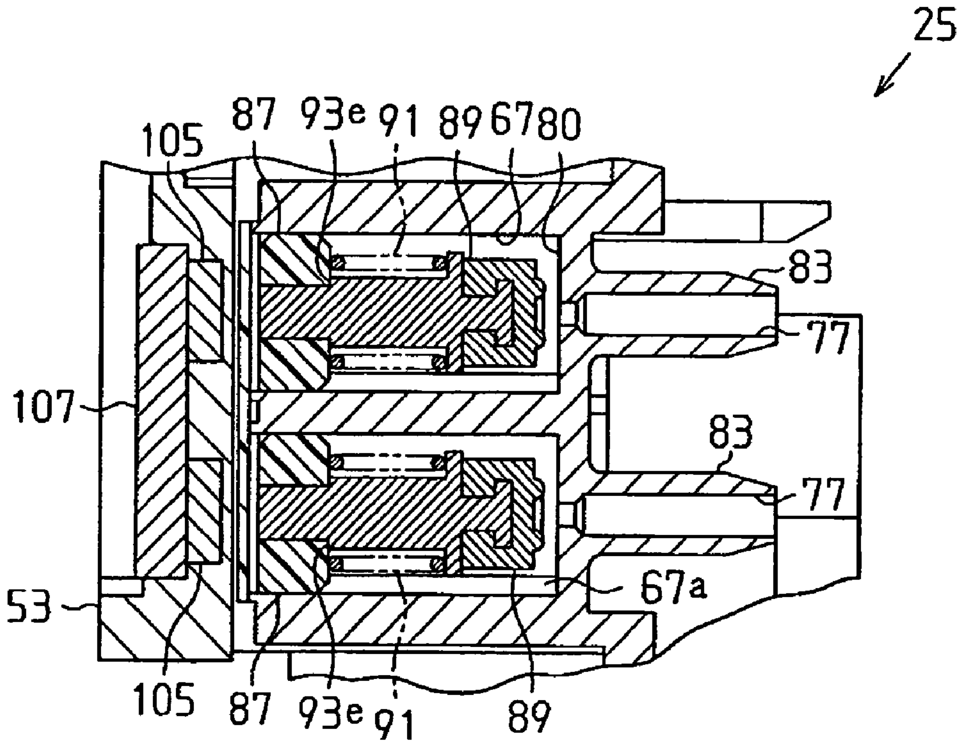
FIG. 19 is a cross-sectional view showing a state in which the second penetration passages are opened in the connection member of FIG. 18.

As shown in FIGS. 17 to 19, in this embodiment, each of the second penetration passages 67 comprises the large diameter portion 71, small diameter portion 75, and discharging portion 77 in order from the back face 57*b* of the groove forming member 57 toward the front face 57*a,* but, does not comprise the middle diameter portion 73 which the second penetration passage 67 in FIG. 8 has. Nevertheless, also the second penetration passages 67 of this embodiment may comprise the middle diameter portions 73 similarly to the second penetration passages 67 in FIG. 8, respectively.

In addition, since being formed of a modified polyphenylene ether resin such as Xyron, the guide members 87 have higher melting temperature in comparison with the film material 59 and groove forming member 57. Each of these guide members 87 is non-movably fit into an end of a large diameter portion 71 of a second penetration passage 67.

Each of the magnetic body portions 93 of the valve members 89 has a first shaft 93*c* and a second shaft 93*d* which have substantially cylindrical shapes. The second shaft 93*d* links to the first shaft 93*c,* and has an external diameter smaller than that of the first shaft 93*c.* A step 93*e* is formed between the first shaft 93*c* and second shaft 93*d.* The second shaft 93*d* is inserted into a guide member 87, and is slidable in the axial direction to the guide member 87. The step 93*e* of the magnetic body portion 93 functions as an abutting portion which can abut on the guide member 87. As shown in FIG. 19, when the step 93*e* abuts on the guide member 87, the motion of the magnetic body portion 93 in the direction toward the film material 59 is restricted, and hence, the contact of the magnetic body portion 93 with the film material 59 is avoided. The guide member 87 and the step 93*e* function as an avoidance mechanism for avoiding the magnetic body portion 93 contacting the film material 59.

The length of the second shaft 93*d,* that is, the length of the valve member 89 from the step 93*e* to an end of the second shaft 93*d* is shorter than the distance from a portion of the guide member 87, which can abut on the step 93*e,* to the film material 59. As shown in FIG. 19, in the state where the step 93*e* abuts on the guide member 87, an end of the second shaft 93*d* does not project from the surface of the guide member 87 facing the film material 59, but the entire second shaft 93*d* is just contained within the guide member 87.

In the state where the rotation member 53 is located in the second position, as shown in FIG. 17, the valve member 89 abuts on the step 80 due to the urging force of the first spring 91, and closes the second penetration passage 67. In this state, the step 93*e* of the valve member 89 separates from the guide member 87.

On the other hand, in the state where the rotation member 53 is located in the first position, as shown in FIG. 19, the valve member 89 separates from the step 80 against the urging force of the first spring 91, and opens the second penetration passage 67. In this state, the step 93*e* of the valve member 89 abuts on the guide member 87. That is, when the valve member 89 moves toward the opening position in FIG. 19 from the closing position in FIG. 17, the valve member 89 is prevented from moving across the opening position in FIG. 19 by the step 93*e* abutting on the guide member 87. Hence, contact of the valve member 89 with the film material 59 is avoided.

In addition to the advantages that the embodiments in FIGS. 1 to 16 have, this embodiment has the following advantages.

(16) The guide member 87 is formed of a material different from the modified polyphenylene ether resin such as Xyron, that is, the material of the film material 59 and groove forming member 57. The groove forming member 57 is made of PP (polypropylene), and a portion of the film material 59 that is thermally welded to the groove forming member 57 is a layer similarly made of PP. The modified polyphenylene ether resin has a melting temperature higher than PP (polypropylene). Therefore, when the thermal welding of the film material 59 to a groove forming member 57 is performed, the guide member 87 does not deform with heat, or does not perform deposition on the film material 59 or groove forming member 57. Accordingly, a malfunction caused by a thermal welding operation with the film material 59 and the groove forming member 57, never occurs in the guide member 87. In addition, since it is a nonmagnetic body, the guide member 87 does not affect the attraction between the permanent magnet 105 of the rotation member 53 and the magnetic body portion 93 of the valve member 89. Hence, the guide member 87 makes motion of the valve member 89 accurate and secure.

(17) When the valve member 89 separates from the step 80 to open the second penetration passage 67, the step 93*e* of the valve member 89 abuts on the guide member 87. In this state, lest the second shaft 93*d* inserted into the guide member 87 should protrude from the guide member 87, the length of the second shaft 93*d* of the valve member 89 is set. Accordingly, contact of the valve member 89 with the film material 59 is avoided, and therefore, there is no possibility that the film material 59 may be damaged by the valve member 89. Therefore, the reliability of the connection member 25 is improved.

(18) When the step 93*e* of the valve member 89 abuts on the guide member 87 in the second penetration passage 67, the axial movement of the valve member 89 is restricted. Therefore, the impulsive sound made when the step 93*e* abuts on the guide member 87 is decreased by the ink in the second penetration passage 67. Accordingly, it is possible to relax the impulsive sound made in connection with the abutting of the members that construct the valve 85, and to achieve low-noise operation of the ink jet type recording apparatus 11.

In addition, each of the above-mentioned embodiments may be changed as follows.

The shape of the permanent magnets 105 is not limited to the substantially square plate one, but may be changed into another shape, such as a disc.

In each of the above-mentioned embodiments, six permanent magnets 105 are provided in one rotation member 53. However, two or more rotation members 53 each having at least one permanent magnet 105 may be provided, and these rotation members 53 may also be rotated separately, respectively.

In each of the above-mentioned embodiments, the valve members 89 each comprise a magnetic body portion 93 and a sealing portion 95 made of an elastic material. However, the entire valve members 89 each may also be formed with a magnetic body.

The flanges 93*a* may also be omitted from valve members 89 respectively.

The plates 107 may also be omitted from rotation members 53 respectively.

When the rotation member 53 is located in the first position, a member other than the film material 59 may also be located between the permanent magnets 105 and valve members 89.

The restricting member 55 may have a configuration other than the one described above as long as the member 55 is capable of transmitting motion of the ink cartridge 23 to the rotation member 53.

In each of the above-described embodiments, the rotation member 53 is moved between the first position and second position by the restricting member 55 which operates in connection with the detaching operation of the ink cartridge 23 from the connection member 25. However, the rotation member 53 may be moved between the first position and second position in connection with an operation other than the detaching operation of the ink cartridge 23. For example, a mechanism which can move the rotation member 53 between the first state and second state in the state that the ink cartridge 23 is connected to the connection member 25 may be provided. In this case, it becomes possible to switch the second penetration passages 67 into the opening state and closing state in the state that the ink cartridge 23 is connected to the connection member 25. This permits the valve 85 to function as a choke valve for removing a bubble and the like, which stagnate in the supply tubes 22.

That is, in the ink jet type recording apparatus 11 in each of the above-mentioned embodiments, it is possible to perform choke cleaning by making the valve 85 function as the choke valve. The choke cleaning is an action to efficiently exhaust a bubble in an ink passage by using negative pressure by generating negative pressure in the ink passage with a suction unit such as a suction pump. The valve 85 which functions as the choke valve is used in order to open and close the ink passage at the time of choke cleaning. In addition, this apparatus may also be constructed so as to perform this choke cleaning independently for each ink passage.

The restricting member 55 may be omitted, and at the time of the detaching operation of the ink cartridge 23 from the connection member 25 instead of to it, the rotation member 53 may be moved between the first position and second position directly by the ink cartridge 23.

Each of the first to third springs 91, 121, and 133 may be also changed into another urging member that can urge a member, becoming an object of urging, to one direction.

In each of the above-mentioned embodiments, the valve members 89 are urged toward the steps 80 with the first springs 91 respectively. However, instead of the first springs 91, urging members urging the valve members 89 toward the direction of separating the valve members 89 from the steps 80 may be also provided, respectively. In this case, it is necessary to also change the construction of the rotation member 53 and restricting member 55 which restricts motion of the rotation member 53. That is, the construction needs to be changed such that, in the state where the ink cartridge 23 is not connected to the connection member 25, the rotation member 53 is located in the first position so that the attraction, which can make the valve members 89 abut on the steps 80 against the urging forces of the urging members, acts between the permanent magnets 105 and valve members 89, respectively. In addition, the construction needs to be changed such that, in the state that the ink cartridge 23 is connected to the connection member 25, the rotation member 53 is located in the second position so that the valve members 89 are allowed to separate from the steps 80 by the urging force of the urging members.

In each of the above-mentioned embodiments, the rotation member 53 is urged toward the first position by the second spring 121. However, instead of the second spring 121, an urging member urging the rotation member 53 toward the second position may also be provided. In this case, for example, the restricting member 55 is constructed such that, in the state where the ink cartridge 23 is not connected to the connection member 25, the rotation member 53 is permitted to move to the second position by an urging member. In addition, the restricting member 55 is constructed such that, in the state where the ink cartridge 23 is connected to the connection member 25, the rotation member 53 is restricted in the first position against the urging force by an urging member.

In each of the above-mentioned embodiments, the restricting member 55 is urged toward the restriction position by the third spring 133. However, instead of the third spring 133, an urging member urging the restricting member 55 toward the non-restriction position may also be provided. In this case, a mechanism which maintains the restricting member 55 in the restriction position against urging force of an urging member is provided, for example, in the state where the ink cartridge 23 is not connected to the connection member 25. The mechanism is constructed such that, in the state where the ink cartridge 23 is connected to the connection member 25, the restricting member 55 is allowed to be moved to the non-restriction position by the urging force of the urging member.

The guide members 87 may be also formed of a non-magnetic metal material such as aluminum instead of a modified polyphenylene ether resin such as Xyron.

Each of the valve devices may be also provided in a location other than the location between a corresponding supply tube 22 and the ink cartridge 23.

In each of the above-mentioned embodiments, explanation is performed by using the ink jet type recording apparatus 11 (including a printing apparatus such as a facsimile or a copying machine) which ejects ink as a fluid ejection apparatus. However, the present invention may be also embodied in a liquid ejection apparatus which ejects a fluid other than ink. Such liquid ejection apparatuses include a liquid ejection apparatus which ejects an electrode material, a color material, or the like, which is used for the production of a liquid crystal display, an EL display, an area light emission display unit, or the like, as a fluid, a liquid ejection apparatus which ejects a biological organic substance, which is used for biochip production, as a fluid, and a sample ejection apparatus as a precision pipette.

Although only several embodiments are described, it will be clear for those skilled in the art that the present invention may be embodied with other characteristic forms within the scope hereof which does not deviate from its spirit. The present invention is not limited to the contents described here, and may be improved within the scope of the attached claims.

The invention claimed is:

1. A liquid ejection apparatus comprising:

a fluid reservoir which stores a fluid and has a fluid discharging outlet;

a fluid ejection head which has a nozzle and ejects a fluid from the nozzle toward a target;

a passage forming member which has a passage which leads the fluid to the fluid ejection head from the fluid reservoir and a hollow needle which communicates with the passage and is adapted to be inserted in the fluid discharging outlet;

a valve seat provided in the passage;

a valve member provided in the passage, wherein the valve member is movable in a first direction of approaching the valve seat and in a second direction of separating from the valve seat so as to close and open the passage, and the valve member having a magnetic body; and a rotation member which is rotatable between a first position and a second position relative to the passage forming member, the rotation member having a magnet, wherein, when the fluid reservoir is in a non-insertion position where the needle is not inserted in the fluid discharging outlet, the rotation member is located in the second position, and, when the fluid reservoir is moved in an insertion position where the needle is inserted in the fluid discharging outlet, the rotation member moves to the first position from the second position, wherein, when the rotation member is located in the first position, an attraction that can move the valve member in the second direction acts between the magnet and the magnetic body, and, when the rotation member is located in the second position, the attraction that can move the valve member does not act between the magnet and the magnetic body; and a restricting member which is moveable between a restriction position and a non-restriction position, wherein, when being located in the restriction position, the restricting member restricts movement of the rotation member so that the rotation member is located in the second position, and, when being located in the non-restriction position, the restricting member does not restrict the movement of the rotation member, and, when the fluid reservoir moves to the insertion position from the non-insertion position, the restricting member is pressed by the fluid reservoir, and is moved to the non-restriction position from the restriction position.

2. The liquid ejection apparatus according to claim 1, wherein the passage forming member has a groove forming member which has a groove, and a film material, which seals the groove so as to form the passage, and, when the rotation member is located in the first position, the film material is located between the magnet and the valve member.

3. The liquid ejection apparatus according to claim 1, wherein the fluid reservoir is capable of being connected to and disconnected from the liquid ejection apparatus, wherein, when the fluid reservoir is disconnected from the liquid ejection apparatus, the rotation member is located in the second position, and, when the fluid reservoir is connected to the liquid ejection apparatus, the rotation member moves to the first position from the second position.

4. The liquid ejection apparatus according to claim 1, wherein the restricting member comprises a shank, and first and second arm portions which extend outward in the radial direction from the shank, the restricting member is rotatable relative to the passage forming member with the shank as a center, and, when the restricting member is located in the restriction position, the first arm portion abuts on the rotation member to maintain the rotation member in the second position, and the second arm portion is provided so as to be pressed by the fluid reservoir.

5. The liquid ejection apparatus according to claim 1, further comprising an urging member which urges the restricting member toward the restriction position.

6. The liquid ejection apparatus according to claim 5, further comprising an urging member which urges the rotation member toward the first position, wherein the urging member that urges the rotation member exerts an urging force smaller than that of the urging member that urges the restricting member.

* * * * *